United States Patent
Amin-Sanayei

(10) Patent No.: US 10,160,820 B2
(45) Date of Patent: Dec. 25, 2018

(54) FLUOROPOLYMERS

(71) Applicant: Arkema Inc., King of Prussia, PA (US)

(72) Inventor: Ramin Amin-Sanayei, Malvern, PA (US)

(73) Assignee: Arkema Inc., King of Prussia, PA (US)

( * ) Notice: Subject to any disclaimer, the term of this patent is extended or adjusted under 35 U.S.C. 154(b) by 110 days.

(21) Appl. No.: 14/772,124

(22) PCT Filed: Mar. 7, 2014

(86) PCT No.: PCT/US2014/021499
§ 371 (c)(1),
(2) Date: Sep. 2, 2015

(87) PCT Pub. No.: WO2014/149911
PCT Pub. Date: Sep. 25, 2014

(65) Prior Publication Data
US 2016/0009840 A1    Jan. 14, 2016

Related U.S. Application Data

(60) Provisional application No. 61/788,434, filed on Mar. 15, 2013.

(51) Int. Cl.
| | |
|---|---|
| *C08F 14/22* | (2006.01) |
| *C08F 14/24* | (2006.01) |
| *C08F 14/26* | (2006.01) |
| *C08F 14/28* | (2006.01) |
| *C08F 2/00* | (2006.01) |
| *C08F 214/22* | (2006.01) |
| *C08F 214/18* | (2006.01) |
| *H01M 4/62* | (2006.01) |

(52) U.S. Cl.
CPC ............ *C08F 214/225* (2013.01); *C08F 2/00* (2013.01); *C08F 14/22* (2013.01); *C08F 14/24* (2013.01); *C08F 14/26* (2013.01); *C08F 14/28* (2013.01); *C08F 214/18* (2013.01); *C08F 214/186* (2013.01); *C08F 214/22* (2013.01); *H01M 4/623* (2013.01)

(58) Field of Classification Search
CPC .. C08F 2/00; C08F 14/18; C08F 14/20; C08F 14/22; C08F 14/24; C08F 14/28; H01M 4/62
See application file for complete search history.

(56) References Cited

U.S. PATENT DOCUMENTS

| | | |
|---|---|---|
| 3,318,850 A | 5/1967 | Stilmar |
| 5,135,998 A | 8/1992 | Mares et al. |
| 5,415,958 A | 5/1995 | Takahashi et al. |
| 5,444,140 A | 8/1995 | Paine et al. |
| 5,723,556 A | 3/1998 | Jones |
| 5,776,637 A | 7/1998 | Kashio et al. |
| 6,586,547 B1 * | 7/2003 | Amin-Sanayei ...... C08F 214/22 526/250 |
| 6,620,342 B1 | 9/2003 | Burchill et al. |
| 7,241,817 B2 | 7/2007 | Bonnet et al. |
| 8,182,912 B2 | 5/2012 | Bonnet et al. |
| 2007/0100099 A1 | 5/2007 | Hung et al. |
| 2008/0249201 A1 | 10/2008 | Kawakami et al. |
| 2010/0016533 A1 | 1/2010 | Pacetti |
| 2012/0015246 A1 | 1/2012 | Amin-Sanayei et al. |

OTHER PUBLICATIONS

EP search report.*
Panchalingam, V., et al "New Vinylidene Fluoride Copolymers: Poly(vinylacetate-co-vinylidene fluoride)". J.Polymer Science, Polymer Letters Edition, Wiley, New York, vol. 27, No. 6, Part C, 1989, pp. 201-208.

* cited by examiner

*Primary Examiner* — Haidung D Nguyen
(74) *Attorney, Agent, or Firm* — Thomas F. Roland

(57) ABSTRACT

The invention relates to novel linear, semi-crystalline fluoropolymers containing 0.5 to 25 mole percent of at least one vinyl ester monomer unit. At least 40 mole percent of the vinyl ester monomer units are present in the copolymer as single monomer units (not diads or triads or greater) between two fluoromonomer units. The invention also relates to a process for forming the fluoromonomers/vinyl ester copolymer. The fluoropolymer of the invention may be used in applications benefiting from a functional fluoropolymers including as a binder, or for use in forming hydrophilic membranes and hollow fibers.

13 Claims, No Drawings

FLUOROPOLYMERS

This application claims benefit, under U.S.C. § 119 or § 365 of PCT Application Number PCT/US2014/021499, filed Mar. 7, 2014; and U.S. Provisional Applications No. 61/788,434, filed Mar. 15, 2013; said applications incorporated herein by reference.

FIELD OF THE INVENTION

The invention relates to novel linear, semi-crystalline fluoropolymers containing 0.5 to 25 mole percent of at least one vinyl ester monomer unit. At least 40 mole percent of the vinyl ester monomer units are present in the copolymer as single monomer units (not diads or triads or greater) between two fluoromonomer units. The invention also relates to a process for forming the fluoromonomers/vinyl ester copolymer. The fluoropolymer of the invention may be used in applications benefiting from a functional fluoropolymers including as a binder, or for use in forming hydrophilic membranes and hollow fibers.

BACKGROUND OF THE INVENTION

Fluoropolymers are traditionally used for applications requiring special properties, such as low surface energy, high resistance to chemical attack, aging resistance, and electrochemical stability. However, these advantageous properties also make fluoropolymers difficult to work with and limits their applications. For example, the lack of functional groups on the fluoropolymers makes them difficult: to adhere to substrates, to facilitate cross-linking, to provide sites for subsequent chemical modification, to be wetted by water, and to add hydrophilic characteristics. There is a need for fluorinated polymers having modified properties, such as functional groups, which can augment their properties. Fluoropolymers have been post reaction grafted, such as with maleic anhydride to add functionality (U.S. Pat. No. 7,241,817 and U.S. Pat. No. 8,182,912).

However it is difficult to add functional monomer units directly into the polymerizing polymer backbone, especially in a random manner, due to the aggressive nature of the fluorine-containing free radicals.

US 2008-0249201 describes sequential polymerization of vinylidene difluoride (VDF) followed by polymerization of vinyl acetate (VAc) polymerized within the pores of the PVDF particles. This assures intimate blending, but does not form a random copolymer.

U.S. Pat. No. 5,415,958, discloses copolymerization of vinylidene fluoride with an unsaturated dibasic acid monoester polar monomer; to introduce carbonyl groups to the backbone of PVDF in order to improve its adhesion to different substrates.

An article by V. Panchalingam and J. R. Reynolds describes the copolymerization of VAc with VDF. (J. Polm. Sci Part C 27 201 (1989). The resultant copolymers did not have uniform distribution of VAc. Their characterization proved that one phase was rich in VAc and the other phase was reach in VDF.

It has now been found that random copolymers of fluoropolymers, and especially vinylidene fluoride, and be copolymerized with vinyl esters, so that a minimum of 40% of the vinyl ester monomer units exist as single units within the polymer backbone.

SUMMARY OF THE INVENTION

The invention relates to a random copolymer comprising from 75 to 99.95 mole percent of one or more fluoromonomers, and 0.05 to 25 mole percent of one or more vinyl ester having the formula $CH_2=CH-O-(CO)-Rn$, wherein Rn is a hydrogen atom or a $C_{1-4}$ linear or branched hydrocarbon, and wherein at least 40 mole percent of the vinyl ester monomer units are present in the copolymer as single monomer units between two fluoromonomer units.

The invention also relates to a starve-feed process for producing the random vinyl ester copolymer.

DETAILED DESCRIPTION OF THE INVENTION

Unless otherwise noted, all percentages are in weight percent, and all molecular weights are weight average molecular weights.

The invention relates to a copolymer of 75 to 99.95 mole percent of at least one fluoromonomer and at least 0.05 to 25 mole percent of at least one vinyl ester having the formula $CH_2=CH-O-(CO)-Rn$, wherein Rn is a hydrogen atom or a $C_{1-4}$ linear or branched hydrocarbon. In which at least 40% of vinyl ester fraction is randomly distributed in single units (between two fluoromonomer units) in the polymer backbone.

Fluoromonomers, as used according to the invention, means a fluorinated and olefinically unsaturated monomer capable of undergoing free radical polymerization reaction. Suitable exemplary fluoromonomers for use according to the invention include, but are not limited to, vinylidene fluoride (VDF), vinyl fluoride (VF), trifluoroethylene, tetrafluoroethylene (TFE), ethylene tetrafluoroethylene, chlorotrifluoroethylene (CTFE) and hexafluoropropylene (HFP), and mixtures thereof.

Preferably the fluoromonomers(s) is 50 to 100 weight percent vinylidene fluoride, more preferably 70 to 100 weight percent vinylidene fluoride. The vinyl ester monomer of the invention is present in the copolymer at from 0.05 to 20 mole percent, preferably from 0.5 to 15 mole percent, and more preferably from 1 to 10 mole percent. The copolymer contains one or more vinyl ester monomers having the formula $CH_2=CH-O-(CO)-Rn$, wherein Rn is a hydrogen atom or a $C_{1-4}$ linear or branched hydrocarbon. A preferred vinyl ester monomer is vinyl acetate.

A preferred copolymer of the invention is a random copolymer of vinylidene fluoride and vinyl acetate. Random terpolymers, such as those composed of vinylidene fluoride, hexafluoropropene, chlorotrifluoroethylene, and vinyl acetate are also anticipated.

The copolymer of the invention may be formed from solution or emulsion polymerization, and is formed in a continuous or semi-batch free-radical reaction. A free-radical emulsion polymerization will be described, however one of ordinary skill in the art would be able to adapt the procedure to other polymerization processes. In a preferred polymerization process, the fluoropolymer is prepared by a free radical polymerization of the co-monomers in aqueous media in presence of free radical initiator(s) for a sufficient time and at a sufficient pressure and temperature to form the fluoropolymer.

To a reactor is initially added, deionized water, and at least one surfactant, preferably a non-fluorinated surfactant. This is followed by deoxygenation. After the reactor reaches the desired temperature, VDF monomer is added to the reactor to reach a predetermined pressure and then the free radical initiator is introduced to the reactor with a suitable flow rate to maintain proper polymerization rate. Once the reaction has started or simultaneously with the beginning of the reaction, or after certain conversion, the co-monomers of VDF and vinyl ester (and optionally other fluoromonomers) are continuously fed at a desired ratio into the reactor. The ratio is selected so that vinyl ester is starved-fed to the reactor during the course of polymerization. In starve-feed polymerization, the monomer addition is introduced gradually into the reactor at a rate that allows the majority of monomer to be consumed by the reaction before more is added. The purpose is to control the distribution of different monomers to minimize blockiness, which can lead to significantly different properties in the final polymer from one with a more statistically random distribution of monomers.

After reaching the desired polymer solids level, the feed of the monomers can be stopped, but the charge of the initiator is preferably maintained to consume any unreacted monomers. The initiator charge can then be stopped, and reactor pressure dropped, followed by cooling of the reactor. The unreacted monomers can be vented and the fluoropolymer collected through a drain port or other collection means. The polymer can be isolated using standard isolation techniques (such as oven drying, spry drying, shear or acid coagulation followed by drying etc.) or kept in the emulsion form for subsequent applications.

The fluoropolymer dispersion exhibits good shelf stability. If needed, anti-settling agent(s) or surfactant(s), diluted in water can be post-added to the PVDF dispersion latex with stirring, in order to provide further storage stability for the latex.

The copolymer of the invention shows good adhesion to different substrates, e.g., metal and metal oxides, possesses hydrophilic characteristics, and exhibits excellent chemical and electrochemical resistance.

The resin of this invention would have both hydrophilic characteristics of vinyl ester combined with water and chemical resistant of vinylidene fluoride resin which makes it suitable for manufacturing of hydrophilic porous membrane or hollow fibers used in filtration of aqueous media.

The hydrophilicity of the copolymer can be confirmed by constant contact angle after immersion in hot water for a prescribed period of time and the good water resistance of the composition may be confirmed by a weight loss during the same experiment.

When a vinylidene fluoride polymer and a hydrophilic polymer are simply mixed, or produced by sequential polymerization, these polymers cannot be uniformly melt-mixed together at a sub-molecular level, and as a result, would not have the proper chemical resistance and longevity needed for uses such as water purification membranes and hollow fibers.

The vinylidene fluoride copolymer of the invention can be used as a binder for electrode-forming composition in a non-aqueous solvent-type secondary battery or in a capacitor. An aqueous-based slurry is formed, containing the fluoropolymer dispersion of the invention, and one or more powdery electrode-forming materials, plus optional ingredients including a fugitive adhesion promoter such as an organic carbonate, thickeners, anti-settling agents, surfactants and wetting agents. The pH can be adjusted, if needed, for the thickener to be effective. The slurry can be preferably coated onto an electroconductive material to form electrode.

The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, and 25° C. depending on application methods.

In another embodiment, a slurry can be formed by first isolating and drying the vinylidene fluoride copolymer of this invention, then combining it with a solvent capable of dissolving the vinylidene fluoride copolymer, and adding a particulate active material.

The slurry formed by either process above, is applied onto at least one surface, and preferably both face surfaces, of an electroconductive substrate by means known in the art, such as by brush, roller, ink jet, squeegee, foam applicator, curtain coating, vacuum coating, or spraying. The electroconductive substrate is generally thin, and usually consists of a foil, mesh or net of a metal, such as aluminum, copper, lithium, iron, stainless steel, nickel, titanium, or silver. The coated electroconductive substrate is then dried to form a coherent composite electrode layer that may then be calendered, providing an interconnected composite electrode usable in a non-aqueous-type battery.

Both the aqueous-borne, and/or solvent-borne slurry-coated electrode described above can optionally be baked at elevated temperature to achieve high adhesion strength. The dried electrode can be optionally subjected to calendering at high pressure and high temperature to further improve electrode adhesion.

EXAMPLES

Example 1

To a 7.5 liter, stainless steel reactor was added 4000 g of water and 2.5 g of PLURONIC 31R1 as the surfactant. The mixture was purged with argon and agitated for 0.5 hours. The reactor was sealed, while agitation was continued, and was heated to 83° C. The reactor was charged with vinylidene fluoride to a pressure of 650 psig; an aqueous initiator solution, comprised of 0.85 wt. % in potassium persulfate and 0.85% wt % in sodium acetate, was charged at 480 g/hr to start the reaction and then the initiator solution feed rate was set at about 60.0 g/h throughout the rest of the reaction. The reaction pressure was maintained at 650 psig by adding as needed vinylidene fluoride and vinyl acetate with predetermined ratio as presented in TABLE 1. After total of 2000 g of VDF is added to the reactor the monomer feeds were stopped. For a period of 10 minutes agitation was continued, and the temperature was maintained. The agitation and heating were discontinued. After cooling to room temperature, surplus gas was vented, and the reactor was emptied of latex through a stainless steel mesh. Gravimetric solids measurements of the latex were conducted and polymer yields were determined based on the weight of the vinylidene fluoride and vinyl acetate fed to the reactor. The amount of potassium persulfate, which was used to convert the monomer to polymer, is reported based on the weight of vinylidene fluoride monomer.

TABLE 1

|  | Nominal VAc % ratio to VDF | Actual VAc % on total VDF | Incorporated VAc % in polymer by NMR | Efficiency incorporation |
| --- | --- | --- | --- | --- |
| VAc-3 | 2 | 1.77 | 1 | 56% |
| VAc-4 | 3 | 2.57 | 1.4 | 54% |
| VAc-5 | 3 | 2.66 | 1.9 | 71% |
| VAc-6 | 4 | 3.07 | 2.5 | 81% |
| VAc-7 | 5 | 4.04 | 3.4 | 84% |
| VAc-10 | 6 | 5.15 | 4.1 | 80% |

The latex stability was assessed based on settling characteristics; for example, latexes with 6% VAc did not settle even after 300 days of storage at ambient condition.

The particle size of the dispersion was determined using a Nicomp Model 380 Sub Micron Particle Sizer including single mode 35 mW Laser diode with wavelength of 639 nm.

NMR analysis, 1H and 19F spectra were acquired on the Bruker DRX 500 (11.75 T) equipped with a 5 mm TXO probe. Samples were prepared by dissolution in "dry" DMSO-d6 at 80° C. "Dry" means from single vials where the contents have never been exposed to air. Approximately 0.1 wt % solutions were made up. There can be some overlap between residual water in the DMSO solvent and the isoregic—$CH_2$-'s region, thus DMSO-d6 from vials were used to ensure the lowest amount of water possible was in the solvent. NMR spectra were acquired by running the samples at 50° C. for data acquisition. The peak assignment for vinyl acetate in $^1$H-NMR were 5.5 ppm for singlet (-VDF-VAc-VDF-), 5.3 ppm for diad (-VDF-VAc-VAc-VDF-), and 4.9 ppm for triad and higher.

The DSC scan measuring the crystalline content and melting temperature is performed according to ASTM D 451-97 using a Perkin Elmer 7 DSC apparatus with an Intercooler II attachment. The instrument is equipped with a dry box with an N2 purge through the dry box. Specimens of 9 to 10 mg are used and crimped in aluminum pans. The DSC run is performed in a three step cycle. The cycle is begun at −50° C. followed by a 10° C./min ramp to 250° C. with a 10 minute hold. The sample is then cooled at a rate of 10° C./min to −50° C. and then unheated at the 10° C./min rate to 250° C.

After resin isolation, the melt viscosity of resin was determined at 230° C. and 100 s-1 according to ASTM D3835.

TABLE 2

| Sample | VAc total %[1] | VAc singlet %[2] | VAc diad %[3] | Solution Viscosity (cp)[4] | Melting Temp (c.) | Crystallinity % | Melt viscosity (kp) |
|---|---|---|---|---|---|---|---|
| VAc-3 | 1.0 | 95.5 | 4.5 | 479 | 158.4 | 46.6 | 51 |
| VAc-4 | 1.4 | 95.2 | 4.8 | 485 | 156.4 | 44.9 | 55 |
| VAc-5 | 1.9 | 97.4 | 2.6 | 454 | 156.9 | 45.6 | 55 |
| VAc-6 | 2.5 | 88.4 | 1.6 | 479 | 154.1 | 45.1 | 57 |
| VAc-7 | 3.4 | 83.4 | 16.6 | 580 | 154.1 | 40.0 | 48 |

[1]Total % of VAc incorporated into fluoropolymer measured by $^1$H-NMR at 5.5, 5.3, and 4.9 ppm
[2]% of 5.5 ppm peak in VAc peaks measured by $^1$H-NMR assigned to (-VDF-VAc-VDF-)
[3]% of 5.3 ppm peak in VAc peaks measured by $^1$H-NMR assigned to (-VDF-VAc-VAc-VDF-)
[4]Solution viscosity in NMP at 5% concentration at room temperature.

What is claimed is:

1. A random, semi-crystalline copolymer comprising from 80 to 99.95 mole percent of one or more fluoromonomers, wherein said fluoromonomers comprise from 70 to 100 weight percent of vinylidene fluoride, and 0.05 to 20 mole percent of one or more vinyl ester having the formula $CH_2$=CH—O—(CO)—Rn, wherein Rn is a hydrogen atom or a $C_{1-4}$ linear or branched hydrocarbon, and wherein at least 40 mole percent of the vinyl ester monomer units are present in the copolymer as single monomer units between two fluoromonomer units.

2. The random copolymer of claim 1, wherein said fluoromonomers are selected from the group consisting of vinylidene fluoride (VDF), vinyl fluoride (VF), trifluoroethylene, tetrafluoroethylene (TFE), ethylene tetrafluoroethylene, chlorotrifluoroethylene (CTFE) and hexafluoropropylene (HFP), and mixtures thereof.

3. The random copolymer of claim 1, wherein said copolymer is a hydrophilic copolymer.

4. The random copolymer of claim 1, wherein said vinyl ester comprises vinyl acetate.

5. The random copolymer of claim 1, wherein the mole percent of vinyl ester monomer units is from 0.5 to 15 mole percent.

6. The random copolymer of claim 5, wherein the mole percent of vinyl ester monomer units is from 1 to 10 mole percent.

7. A process for forming the random copolymer of claim 1, comprising the steps of
   a) charging an initial monomer charge that comprises fluoromonomers, and
   b) starve-feeding the vinyl ester monomer co-continuously with fluoromonomers to the reactor once polymerization has begun.

8. The process of claim 7, wherein said initial monomer feed consists of fluoromonomers.

9. The process of claim 7, wherein only non-fluorinated surfactant is used in the polymerization process.

10. A material comprising the fluoropolymer of claim 1.

11. The material of claim 10, wherein said material is selected from a filtration membrane, a hollow fiber filtration device, and a slurry binder for use in forming a non-aqueous solvent type secondary battery or capacitor electrode.

12. The material of claim 11, wherein said slurry binder is an aqueous-based slurry comprising:
   a) from 0.2 to 150 parts fluoropolymer of claim 1;
   b) from 10 to 500 parts of one or more powdery electrode-forming materials;
   c) optionally from 0 to 10 parts of one or more thickeners;
   d) optionally, one or more pH adjusting agents;
   e) optionally from 0 to 10 parts of one or more additives selected from the group consisting of anti-settling agents and surfactants;
   f) optionally from 0 to 5 parts of one or more wetting agents;
   g) optionally from 0 to 150 parts of one or more fugitive adhesion promoters;
   h) 100 parts water;

all parts being parts by weight based on 100 parts by weight of water, and wherein the composition contains no fluoro-surfactant.

13. The material of claim 11, wherein said slurry binder is a solvent-based slurry, comprising:
   a) from 0.1 to 150 parts fluoropolymer of claim 1,
   b) from 10 to 500 parts of one or more powdery electrode-forming materials;

c) 100 parts of a solvent capable of dissolving said fluoropolymer.

\* \* \* \* \*